(Model.)

J. GÖBBELS.
Machine for Capping Upholstery Nails.

No. 238,106.

4 Sheets—Sheet 1.

Patented Feb. 22, 1881.

Witnesses:
Fred. G. Dieterich
P. C. Dieterich

Inventor:
Joseph Göbbels
by A. Peterson & Co.
attorneys (Model.) 4 Sheets—Sheet 2.

J. GÖBBELS.
Machine for Capping Upholstery Nails.

No. 238,106. Patented Feb. 22, 1881.

Witnesses:
Fred. G. Dietrich
P. L. Dietrich

Inventor:
Joseph Göbbels
by A. Peterson
Attorneys (Model.) 4 Sheets—Sheet 3.

J. GÖBBELS.
Machine for Capping Upholstery Nails.

No. 238,106. Patented Feb. 22, 1881.

WITNESSES
Fred. G. Dietrich
P. C. Dietrich

Joseph Göbbels
INVENTOR
By A. Peterson &c.
Attorney S.

(Model.)   4 Sheets—Sheet 4.
J. GÖBBELS.
Machine for Capping Upholstery Nails.
No. 238,106.   Patented Feb. 22, 1881.
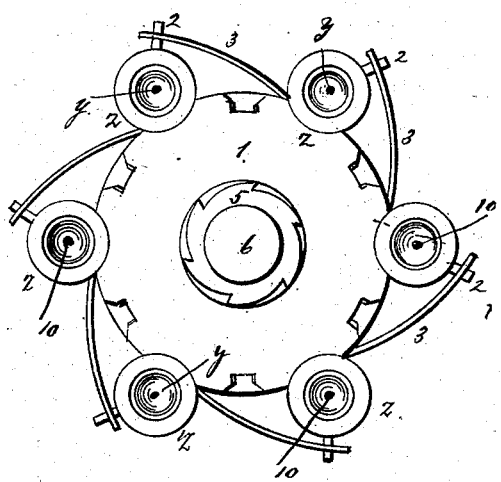
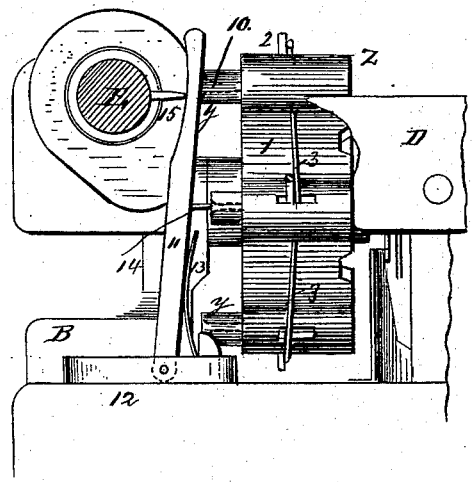
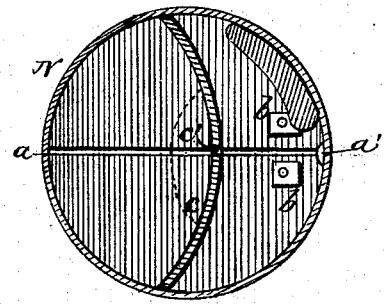
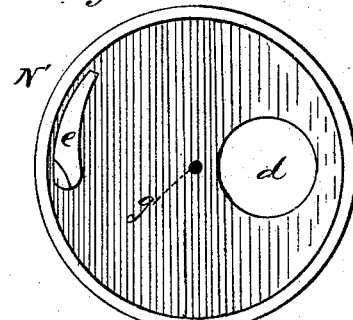
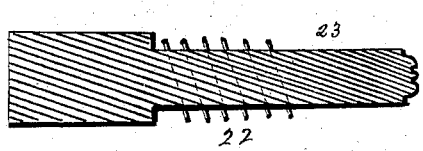
Witnesses
Fred G. Dieterich
P. C. Dieterich
Inventor:
Joseph Göbbels
by A. Peterson Jr.
Attorneys

UNITED STATES PATENT OFFICE.

JOSEPH GÖBBELS, OF ST. JOHN'S, KENTUCKY.

MACHINE FOR CAPPING UPHOLSTERY-NAILS.

SPECIFICATION forming part of Letters Patent No. 238,106, dated February 22, 1881.

Application filed June 30, 1880. (Model.)

*To all whom it may concern:*

Be it known that I, JOSEPH GÖBBELS, of St. John's, in the county of Kenton and State of Kentucky, have invented certain new and useful Improvements in Machines for Capping Upholstery-Nails; and I do hereby declare that the following is a full, clear, and exact description of the invention, which will enable others skilled in the art to which it appertains to make and use the same, reference being had to the accompanying drawings, which form a part of this specification.

My invention has relation to machines for the capping of upholstery-nails, or that class of nails the head of which is provided with an ornamental convex cap made of sheet-brass or plated metal; and it consists in the construction and combination of parts of a machine which is adapted to provide the nail-blanks with a double or with a single cap, at the option of the manufacturer.

In the present description of my machine I shall describe only so much of it as has relation to the capping of upholstery-nails with a single head or cap, reserving for another application (or a separate division of my present application of even date herewith and designated Case B) all that part or portion of the machine that relates to the capping of double-capped nails, the production of which involves some changes in the operating parts as at present arranged and combined.

Figure 1:
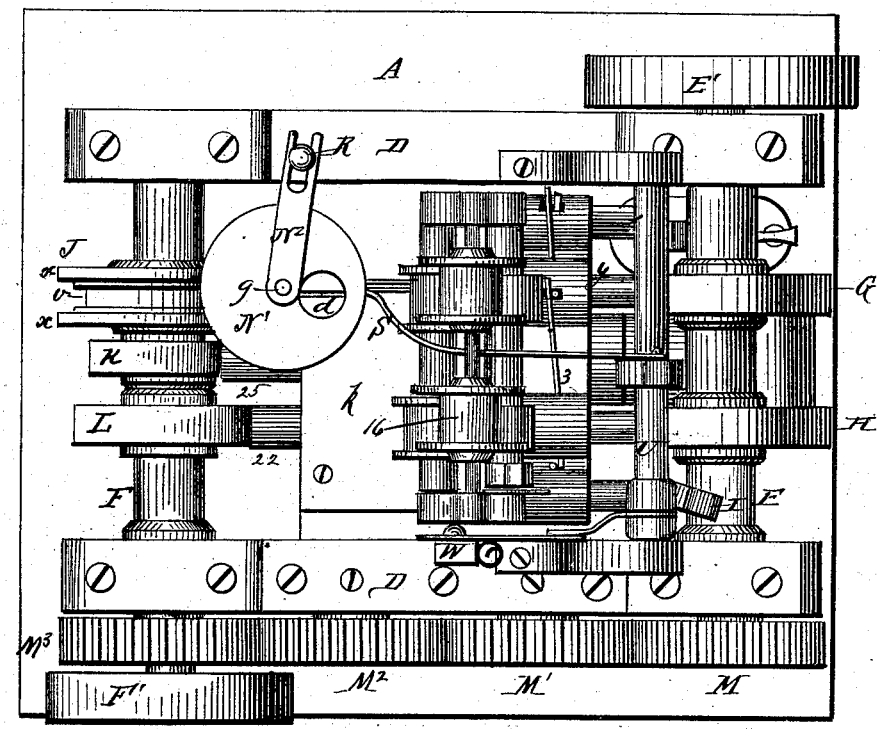
Figure 2:
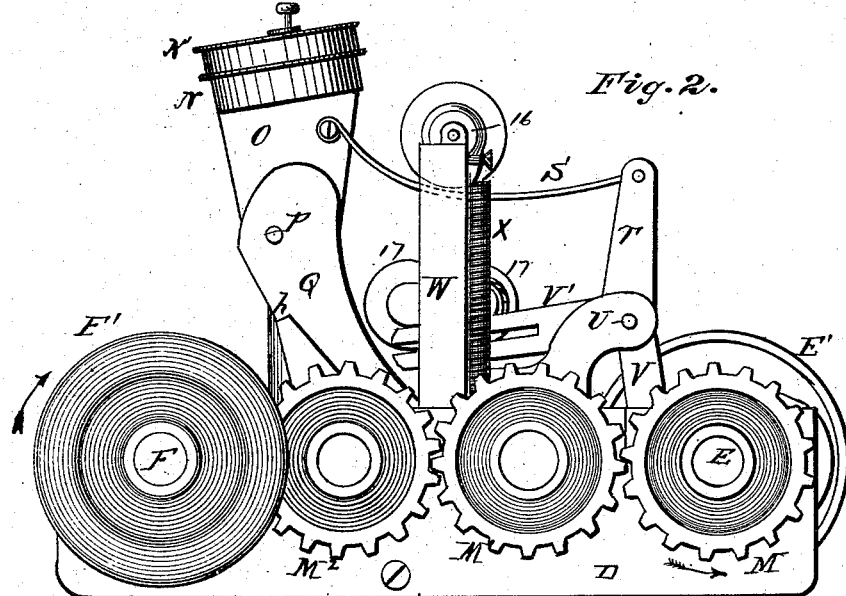
Figure 3:
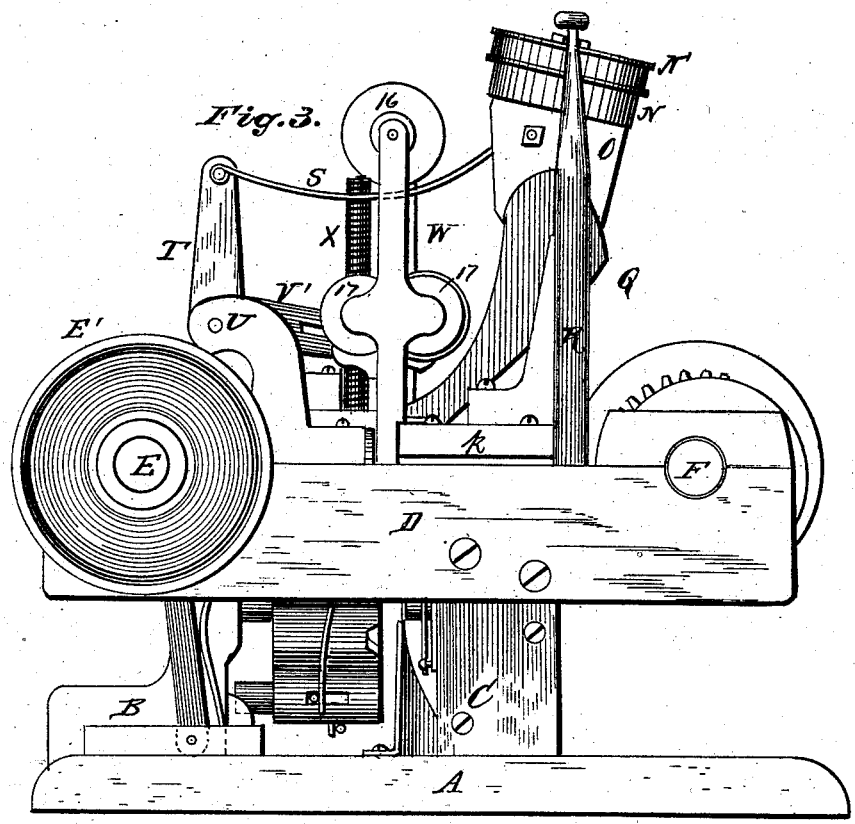
Figure 4:
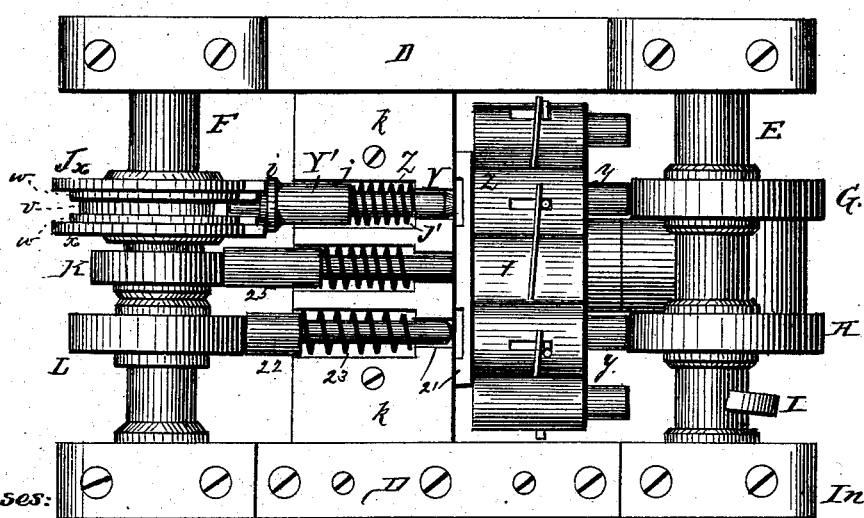
Figure 5:
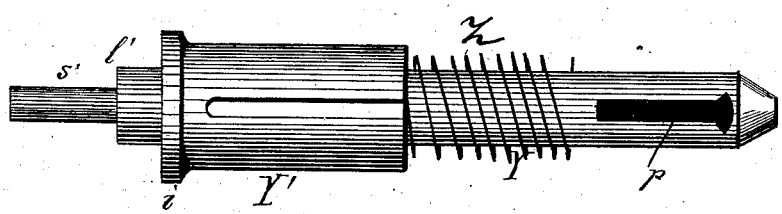
Figure 6:
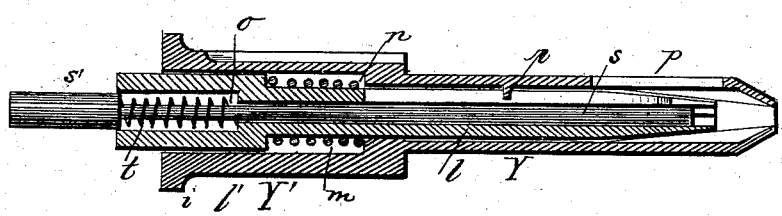
Figure 7:
Figure 8:
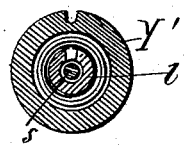
Figure 9:
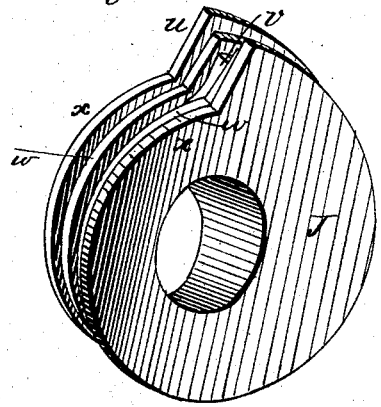
Figure 10:
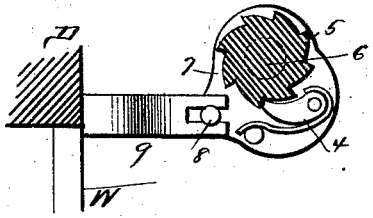

In the drawings hereto annexed, Figure 1 is a plan or top view of the machine. Figs. 2 and 3 are side elevations representing opposite sides. Fig. 4 is a plan of the machine with the cover of the die-box, hopper, and reels removed to show the construction of the dies. Fig. 5 is a top view of the capping-die. Fig. 6 is a longitudinal section of the same. Fig. 7 is a top view of the capping-die plunger. Fig. 8 is a cross-section of the capping-die with its plunger. Fig. 9 is a perspective view of the cam for operating the capping-die and plunger detached from its shaft. Fig. 10 is a detail view of the mechanism for operating the intermittingly-rotating heading-cylinder. Fig. 11 is a face view of the said cylinder with its heading or counter dies. Fig. 12 is a detail view of the discharge mechanism. Fig. 13 is a horizontal section of the hopper-cylinder. Fig. 14 is an inverted view of the cover of the same. Fig. 15 is a longitudinal section of the planchet-die, and Fig. 16 is a section of the capped and finished nail.

Similar letters of reference indicate corresponding parts in all the figures.

A is the foundation or platform of the machine, upon which are mounted two uprights, B C, which support the bed-pieces D D of the frame.

E F are two parallel shafts, which are journaled in opposite ends of the frame, shaft E being provided with a pulley, E', and shaft F with a fly-wheel, F'. Shaft E has three cams, denoted, respectively, by G, H, and I; and F has also three cams, J K L. Shafts E and F are connected by a series of intermeshing gear-wheels, M M' M² M³, causing them, when the machine is in motion, to rotate in opposite directions, as indicated by the arrows.

The nail-blanks to be capped are fed to the capping device of the machine through a cylindrical hopper, N, which is mounted upon a duct or chute, O, hinged at P, at the upper end of and in a vertical plane with a stationary chute, Q. Cylinder N has a diametrical slot, $a$, registering with the mouth of the chute upon which it is mounted, which said slot $a$ has an enlargement, $a'$, at one end, on opposite sides of which are blocks $b\ b$, through which the screws by which the hopper is secured upon its chute are inserted. It has, furthermore, a transverse diaphragm or bridge, $c$, secured permanently in its bottom, which presents its convex side to the enlargement of slot $a$, and its concave side to an aperture, $d$, in the flanged circular cover N' of the hopper-cylinder N. This cover has a downward-projecting lip or cut-off, $e$, and is provided on its upper side with a radial projecting arm, N², which has a slot, $f$, in its outer end. Cover N' is pivoted upon a bolt, $g$, inserted through its center and through a projecting lip or flange of the stationary bridge-piece $c$. The slotted arm N² embraces or rides upon the upper end of a standard or post, R, and the hinged chute-section O is connected, by a rod, S, with a lever-arm, T, which is adjustably keyed or otherwise secured upon a rock-shaft, U. This rock-shaft has a bell-crank secured rigidly at one end, the short arm V of which bears at its lower end against cam I upon shaft E, while its long arm, V', is connected with a vertical sliding bar, W, working in ways in one of the side pieces, D, and held in its lowermost position by a spring, X. Hence bar W, with its spring, will force the bell-crank V V' and rock-shaft U, with its arm T, back into its original position after each revolution of shaft E with its cam I; and as arm T is connected to the hinged hopper by rod S, it follows that an intermittingly-vibrating motion is imparted to the said hopper when the machine is in operation, while its cover N', at the same time and with each vibration of the hopper, receives an oscillating or partly-rotating motion, on account of its being attached to the post or standard R by its slotted arm N². When the machine is at rest, or during the intervals between the vibrations of the hopper, this is in an inclined position, as shown in the drawings. The nail-blanks to be capped are fed in suitable quantities into cylinder N through the aperture d, and are prevented from falling back into the lower part of the cylinder by the diaphragm or bridge-piece c. At each throw or vibration of the cylinder, however, some of the blanks will work down into the slot a, which is too narrow to permit the heads to pass through, so that the blanks will hang suspended from the bottom of the cylinder with their points projecting down into the chute O. As the hopper is tilted back the row of suspended nail-blanks will work through a small slot or aperture, c', in the bridge c, where this spans slot a, down into the lower part of the hopper, where they are cut off, one by one, by the oscillating cut-off lip e, and fed down into the chute, one at a time, through the enlargement a' of the slot, which is large enough to permit the heads to pass. As the nail-blanks, in their downward passage through the chute, reach the stationary lower part, Q, of this, they are tilted forward by a step or shoulder, h, in the upper end of it, with their heads foremost, in which position they reach the capping mechanism. This consists, essentially, of two parts—viz., a reciprocating die, provided with a plunger of peculiar description for holding the nail-shank while it is being capped, and a counter-die working in a cylindrical box in an intermittingly-rotating cylinder, the metal which is to form the cap being fed in a continuous strip, in the manner hereinafter described. The reciprocating capping-die is composed of a hollow cylinder, Y, around which is coiled a spring, Z, that impinges at its rear end upon a cylindrical offset or shoulder, Y', which is provided with an annular flange, i, at its extreme (rear) end. The hollow die Y Y' is placed in a shouldered cylindrical chamber, j, in the rectangular die-box k, which is supported upon the standard C of the machine-frame. The coiled spring Z impinges at one end, as above stated, upon the offset Y', and at the opposite end upon the shoulder j' of the cylindrical chamber j, thus operating to force the die backward against cam J of shaft F, and causing its shoulder i to impinge upon the periphery of said cam.

By reference to Fig. 6 on the drawings, it will be seen that the capping-die Y Y' contains a plunger, l, the rear end of which has an enlarged cylindrical offset, l', which forms an abutment for a coiled spring, m, the forward end of which bears against an annular shoulder, n, inside of cylinder Y'. Plunger l is hollow, and is in its turn provided with an inner shoulder, o. The forward narrow part of this plunger is split longitudinally, so as to form a series of clamps or fingers impinging upon one another, which are compressed—that is, brought together—by being forced, by the means and in the manner hereinafter described, into the tapering front end of the hollow die Y. This part of die Y has a slot, p, which registers with a corresponding slot, q', in the forward end of plunger l, between its fingers, the slots p q' being prevented from turning out of register by a pin, r, which projects down into a longitudinal groove in the plunger and prevents this from turning.

s is a piston which works in the hollow plunger l l', and has, like this, a spiral spring, t, impinging upon the inside annular shoulder of the plunger and the offset s' of the piston.

Thus it will be seen that the capping-die consists of the outer cylinder or die proper, Y Y', provided with the coiled spring Z, the tubular split plunger l l', having spring m, and the piston s s', encircled by the spring t, the outer cylinder and its plunger being provided, moreover, with the registering-slots p q'.

We have already seen that the flanged rear end of the capping-die Y Y' impinges upon cam J of shaft F, which it is now proper to describe. This cam has a shoulder, u, and a deep peripherical groove, v, made with a step or an offset, w w, on each side, so as to leave a narrow rim, x x. When cam J is rotated this rim will bear against the annular flange i of the capping-die, shoulder w w will bear against the enlarged rear end of plunger l l', while the enlarged rear end, s', of the inner piston will, impelled by its spring t, be forced into and bear against the bottom of the groove v.

The nail-blanks, being fed through the hopper N and chute O Q, are received, one at a time, in the forward end of the slotted plunger through the registering-slots p q', head foremost. As cam J revolves, the die containing the nail-blank is forced forward through its chamber j against a counter-die, y, which works in a cylindrical box, z, attached to and forming a part of a cylinder or drum, 1, which is journaled between the standards B C, and rotates intermittingly in a plane transversely to that of the intermittingly-reciprocating capping-die. Each of the counter-dies y has a pin, 2, which projects out through a slot in the box and bears against a spring, 3, the tendency of which is to force the die back from the box containing the intermittingly-reciprocating capping-die. Cylinder 1, with its circumferentially-arranged die-boxes z, is rotated intermittingly by a spring-pawl, 4, which engages with a ratchet-wheel, 5, secured concentrically upon its axis 6. This spring-pawl is pivoted upon a plate, 7, which has a central circular aperture through which the axis 6 is inserted, and a projecting lug or pin, 8, which is inserted into a slotted arm, 9, projecting laterally from the vertically-reciprocating bar W. It follows that at each upstroke of the bar W plate 7, with its spring-pawl, is turned or partly rotated upon the cylinder-axle 6, thus bringing the spring-pawl in contact with the concentric ratchet-wheel, the spurs upon which correspond to the number of counter-dies and boxes, and rotating the cylinder one step or turn, so as to bring the next die opposite to the reciprocating capping-die. Each of the counter-dies has a concave head fitting the convex head of the capping-die, and an axial perforation, 10, having a flaring mouth at its rear end.

11 is a bar, which is hinged at its lower end in a block, 12, and bears against a spring, 13. This bar has a projecting pin, 14, and is vibrated by an arm, 15, secured upon the rotating shaft E. This pin or cam 15, vibrating bar 11, with its pin 14, and the rotating cylinder 1, with its counter-dies, are so combined and arranged relative to each other that when one of the counter-dies is opposite to the capping-die the counter-die next below will be, with its central aperture, 10, exactly opposite to pin 14, the cam 15 being at the same moment ready to strike the upper end of bar 11 and impel it forward.

The sheet-brass or other metal which is to form the caps is, in the form of a narrow strip, coiled around a spool, 16, and passed down between the feed-rollers 17 17, which are rotated intermittingly by any suitable mechanism. A round disk or planchet of metal is cut off from the strip by a die, 22, located in a recess in the die-box k, and operated by cam L upon shaft F, in like manner as the capping-die Y is operated by its cam J, it being, like this, provided with a coiled spring, 23. This die, which, in contradistinction to the capping-die, I call the "planchet-die," has a convex head provided with a central annular groove, (see Fig. 15,) and operates, in conjunction with the counter-dies, precisely in like manner as the capping-die. After the disk or planchet has been cut from the strip it is, by the further advance of the die, forced into that one of the die-boxes z which is, at that stage of the operation of the machine, opposite to the die, where it meets the concave counter-die y, operated by cam H. Caught between these two dies, the planchet which is to form the cap is shaped and provided with a central indentation surrounded by an annular flange, (see Fig. 16,) which said flange is formed by a portion of the metal of the central hollow part of the planchet being forced into the annular groove in the head of the planchet-die. After the withdrawal of this die the shaped cap is left in the die-box z, and with the next turn of cylinder 1 is carried in front of the capping-die, which on its forward stroke carries the head of the nail-blank against and into the central depression in the cap, the nail-blank being advanced a little in front of the die-head by the plunger l, which gripes or clamps the nail. At the moment when the head of the nail-blank has in this manner been inserted into its recess in the cap the central perforated part of the head of the capping-die Y will strike and depress the annular flange which has been made by the planchet-die in the manner described, so as to clinch this around the nail-head, as shown in Fig. 16 of the drawings, thus firmly uniting the nail-blank and its cap. The next operation is the advance through the capping-die and its hollow plunger of the piston s, which shoves the nail out of the capping-die into the die-box z, and on the next turn of cylinder 1 this box is carried down opposite to the ejector-pin 14, which, by the means already described, is inserted through the central aperture of the capping-die and shoves the finished nail out of the box, whence it falls into a suitably-arranged receptacle below. In the finishing process of capping the nail-blank the counter-die is advanced by the cam G.

In order to hold the intermittingly-rotating cylinder 1 rigidly in its position during the operations of the reciprocating planchet and capping dies and their counter-dies, I employ a spring latch-bar, 25, which is operated by the cam or eccentric K on shaft F, and works in a chamber or recess in the die-box k, midway between and parallel to the planchet-die and the capping-die. At each reciprocation of bar 25 its forward end is projected into a notch in cylinder 1, said notches alternating with and being arranged midway between the cylindrical die-boxes z, so that when the cylinder 1 is locked in its position by latch-bar 25 one of its die-boxes, with its counter-die, will be opposite to the planchet-die, the one next to this will be opposite to the capping-die, and the one next to this, again, will be opposite to and register with the ejector-pin 14.

Having thus described my invention, I claim and desire to secure by Letters Patent of the United States—

1. The feeding mechanism composed of the vibrating hopper N N', slotted at a a', and provided with the slotted arm N², concave bridge c, aperture d, and vibrating cut-off e, combined and operating substantially as set forth.

2. In combination, the circular pivoted flanged cover N', having aperture d, cut-off e, and provided with the radial arm N², embracing, with its slotted end, the post or standard R, cylinder N, having diametrical slot a, enlarged at a', and provided with the bridge-piece c, and means for intermittingly vibrating the said cylinder with its superimposed cover, substantially as set forth.

3. The capping-die composed of the hollow shouldered cylinder Y Y', having a convex head and rear flange, $i$, coiled spring Z, hollow slotted plunger $l\ l'$, coiled spring $m$, shouldered piston $s\ s'$, and coiled spring $t$, all constructed and combined to operate substantially in the manner and for the purpose shown and set forth.

4. In combination, the die-box $k$, containing shouldered cylindrical chamber $j\ j'$, the capping-die, composed of the parts Y Y', $l\ l'$, $s\ s'$, and their operating-springs, and cam J, provided with the shouldered peripherical groove $v$ and rims $x\ x$, substantially as set forth.

5. The planchet-die 22, having convex head, made with a central annular groove or depression, and provided with a coiled resistance-spring, 23, substantially as set forth.

6. The combination, with the reciprocating planchet-die 22, constructed as described, of the intermittingly-rotating cylinder 1, having circumferentially-arranged tubular die-boxes $z$, counter-dies $y$, and springs 3, substantially as set forth.

7. The combination, with the reciprocating capping-die Y Y', constructed as described, of the intermittingly-rotating cylinder 1, having circumferentially-arranged tubular die-boxes $z$, counter-dies $y$, and springs 3, substantially as set forth.

8. In combination, shaft F, having cams J K L, reciprocating dies Y Y' 22, provided, respectively, with the springs Z 23, reciprocating latch-bar 25, having resistance-spring 26, intermittingly-rotating cylinder 1, having circumferentially-arranged tubular die-boxes $z$, provided with the counter-dies $y$ and springs 3, and rotating shaft E, having cams G H, substantially as set forth.

9. In combination, shaft F, having cams J K L, reciprocating dies Y Y' 22, provided, respectively, with the springs Z 23, reciprocating latch-bar 25, having resistance-spring 26, intermittingly-rotating cylinder 1, having circumferentially-arranged tubular die-boxes $z$, provided with the centrally-perforated counter-dies $y$ and springs 3, rotating shaft E, having cams G H 15, and vibrating bar 11, having ejector-pin 14, substantially as and for the purpose herein shown and set forth.

10. In combination, the rotating shaft E, having cam I, bell-crank V V', vertical slide-bar W, provided with the resistance-spring X, and laterally-projecting slotted arm 9, cylinder 1, having concentric ratchet-wheel 5, and centrally-perforated plate 7, provided with the spring-pawl 4 and pin 8, substantially as and for the purpose herein shown and specified.

In testimony that I claim the foregoing as my own I have hereto affixed my signature in presence of two witnesses.

JOSEPH GÖBBELS.

Witnesses:
 CHAS. DOERLER,
 C. A. WATSON.